US009425913B2

(12) United States Patent  (10) Patent No.: US 9,425,913 B2
Yu  (45) Date of Patent: Aug. 23, 2016

(54) MULTI-PORT SERIAL MEDIA INDEPENDENT INTERFACE

(75) Inventor: Hongchun Yu, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 95 days.

(21) Appl. No.: 14/380,325

(22) PCT Filed: Mar. 23, 2012

(86) PCT No.: PCT/CN2012/072877
§ 371 (c)(1),
(2), (4) Date: Aug. 21, 2014

(87) PCT Pub. No.: WO2013/139031
PCT Pub. Date: Sep. 26, 2013

(65) Prior Publication Data
US 2015/0036699 A1  Feb. 5, 2015

(51) Int. Cl.
H04J 3/04  (2006.01)
H04J 3/06  (2006.01)
H04L 25/49 (2006.01)

(52) U.S. Cl.
CPC ............. *H04J 3/047* (2013.01); *H04J 3/0638* (2013.01); *H04L 25/4908* (2013.01); *H04J 3/0697* (2013.01)

(58) Field of Classification Search
CPC ....................................................... H04J 3/047
See application file for complete search history.

(56) References Cited

U.S. PATENT DOCUMENTS

| 6,067,585 | A | 5/2000 | Hoang |
| 6,606,328 | B1 | 8/2003 | Susnow |
| 7,342,520 | B1 * | 3/2008 | Katzman ............... H03L 7/18 341/100 |
| 7,343,425 | B1 * | 3/2008 | Lo ................ H04L 49/3054 370/257 |
| 7,492,291 | B2 | 2/2009 | Murray et al. |
| 7,720,068 | B2 | 5/2010 | McClellan |
| 7,835,389 | B2 | 11/2010 | Yu et al. |
| 7,957,391 | B1 | 6/2011 | Subramanian |
| 2003/0161353 | A1 | 8/2003 | Kuo et al. |
| 2003/0179771 | A1 | 9/2003 | Chan et al. |

(Continued)

FOREIGN PATENT DOCUMENTS

| CN | 1667965 A | 9/2005 |
| CN | 1928753 A | 3/2007 |

(Continued)

OTHER PUBLICATIONS

Supplementary European Search Report—EP12872015—Search Authority—The Hague—Oct. 22, 2015.

(Continued)

*Primary Examiner* — John Blanton
(74) *Attorney, Agent, or Firm* — Paradice and Li LLP (57) ABSTRACT

A media independent interface in an integrated circuit device includes a first plurality of channels, each including a data transmit path and a data receive path, and a second plurality of channels, each including a transmit path to transmit an idle symbol and a receive path to receive the idle symbol. The interface also includes a codec, coupled to the transmit paths of the first and second pluralities of channels, to encode data and symbols on the transmit paths, and a multiplexer, coupled to the codec, to multiplex the data on the transmit paths of the first and second pluralities of channels as encoded by the codec. The interface further includes a Ser Des to serialize the multiplexed data.

20 Claims, 9 Drawing Sheets

(56) References Cited

U.S. PATENT DOCUMENTS

| | | | |
|---|---|---|---|
| 2004/0136411 A1* | 7/2004 | Hornbuckle | H04J 3/047 370/537 |
| 2005/0036524 A1* | 2/2005 | Wojtowicz | H04J 3/04 370/537 |
| 2007/0116055 A1 | 5/2007 | Atsumi et al. | |
| 2007/0206709 A1* | 9/2007 | Khermosh | H04L 1/0057 375/343 |

FOREIGN PATENT DOCUMENTS

| | | |
|---|---|---|
| CN | 101615912 A | 12/2009 |
| CN | 101867430 A | 10/2010 |
| CN | 102224702 A | 10/2011 |
| EP | 0923035 A2 | 6/1999 |
| JP | H0936823 A | 2/1997 |
| JP | 2003032259 A | 1/2003 |
| JP | 2003289286 A | 10/2003 |
| JP | 2006319402 A | 11/2006 |
| JP | 2007110457 A | 4/2007 |
| WO | WO-2011152818 A1 | 12/2011 |

OTHER PUBLICATIONS

Taborek R., et al., "Gigabit Ethernet 8B/10B PCS, Change Summary, Rev 5 ; RTpcs8b sums", IEEE Draft; RTPCS8B_SUM5, IEEE-SA, Piscataway, NJ USA, vol. 802.3z, Dec. 2, 1997, pp. 1-19, XP068024767, [retrieved on Dec. 2, 1997]* pp. 1,6 ** pp. 13,15 *.

Endo A., "Technologies to Realize 10G bit/s Communication Rate: 10GbE Physical Layer Interface Family", Monthly ASCII-Dot-Technologies, Japan, ASCII Media Works, Inc., Oct. 1, 2009, vol. 15, No. 10, pp. 76-79.

Nakajima T., "Latest Technologies in Optical Network [6], 10G-EPON Technologies", Nikkei Communication, Japan, Nikkei Business Publications, Inc., Jun. 15, 2009, No. 536, pp. 70-71.

International Search Report and Written Opinion—PCT/CN2012/072877—ISA/EPO—Jan. 3, 2013.

\* cited by examiner

Functional Block of One Channel

MULTI-PORT SERIAL MEDIA INDEPENDENT INTERFACE

TECHNICAL FIELD

The present embodiments relate generally to electronic communications, and specifically to Ethernet communication systems.

BACKGROUND OF RELATED ART

Among the technologies that allow computers and/or other network devices to form a local area network (LAN), Ethernet has become the dominant networking technology and is standardized in the IEEE 802.3 family of standards. The Ethernet standard has evolved over time so that different variants of the Ethernet protocol now exist to support higher bandwidth, improved media access controls, different physical media channels, and/or other functionalities. For example, IEEE 802.3 now has variants covering speeds (or transmission rates) ranging from 10 Mbit/s, 100 Mbit/s, 1 Gbit/s, to 10 Gbit/s and even higher, and has variants that govern physical channels such as coaxial cables, fiber-optics, and unshielded/shielded twisted-pair cables.

In systems and devices that communicate using the Ethernet protocol, an interface exists between the media access control (MAC) layer and the physical layer to facilitate the exchange of information between the two layers. This interface is referred to as a media independent interface (MII). The term MII also refers to a specific type of media independent interfaces, in addition to referring to the entire genus. As used herein, the terms "media access interface" and "MII" will refer to the entire genus of such interfaces, unless otherwise noted. Examples of MIIs include Attachment Unit Interface (AUI), MII, Reduced MII, Gigabit MII (GMII), Reduced GMII, Serial GMII (SGMII), Quad SGMII (QSGMII), 10GMII, and Source Synchronous Serial MII (S3MII).

Designing media independent interfaces presents significant engineering challenges. Examples of these challenges include reducing or minimizing electromagnetic interference (EMI), power consumption, pin count, and circuit board complexity. Accordingly, there is a need for more efficient MII designs.

BRIEF DESCRIPTION OF THE DRAWINGS

The present embodiments are illustrated by way of example and are not intended to be limited by the figures of the accompanying drawings.

Like reference numerals refer to corresponding parts throughout the drawing figures and specification.

DETAILED DESCRIPTION

Methods and apparatuses for communicating between physical layer devices (PHYs) and media access controllers (MACs) are disclosed that transmit signals for a plurality of channels over a single serial data path (e.g., a serial dual-data rate data path), without transmitting a corresponding clock signal. In some embodiments, signals for the plurality of channels are transmitted from a PHY to a MAC via a first differential pair and from the MAC to the PHY via a second differential pair. In other embodiments, similar methods and apparatuses are used for direct communication between two MACs.

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scopes all embodiments defined by the appended claims.

Figure 1:
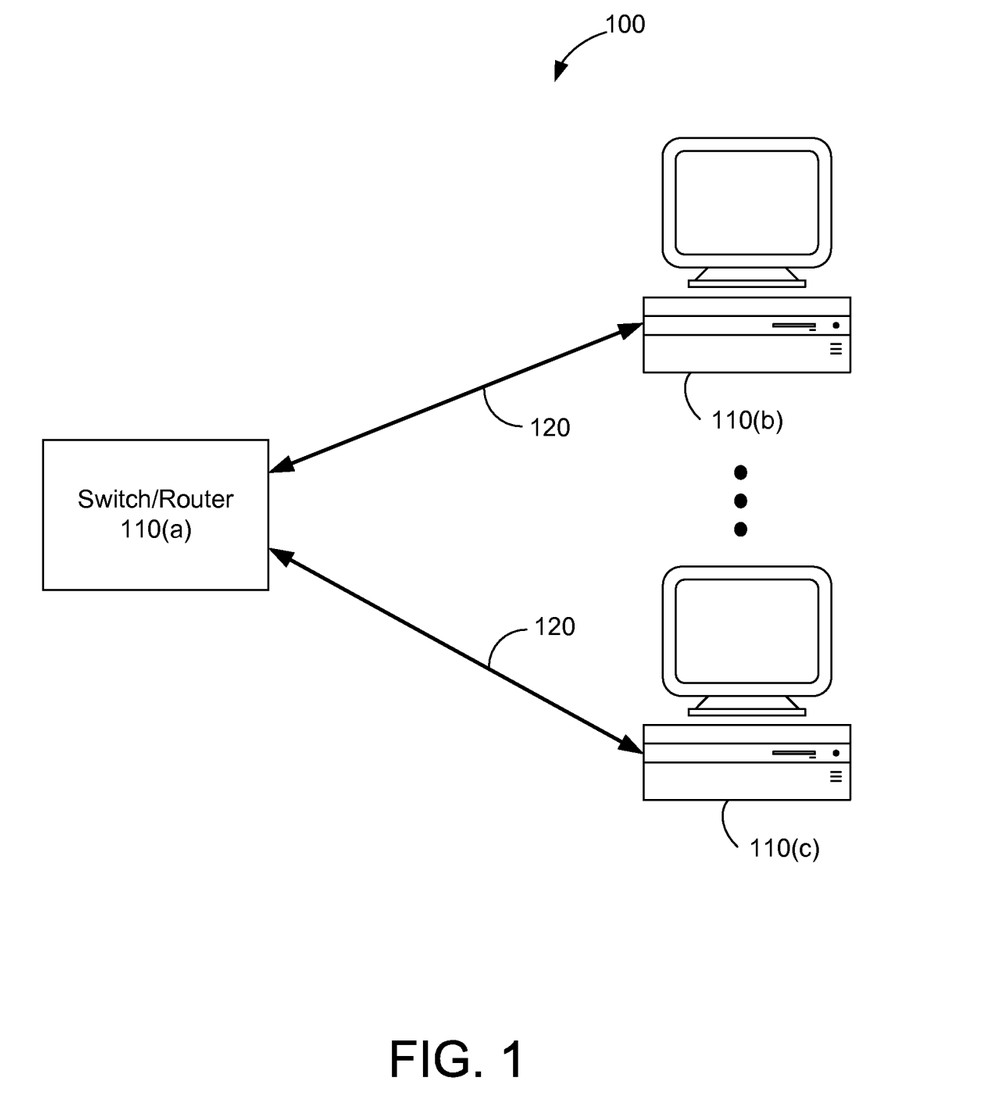
FIG. 1 is a block diagram of a communication system within which the present embodiments may be implemented.

FIG. 1 is a block diagram of an exemplary communication system 100 within which the present embodiments may be implemented. Communication system 100 is shown to include a network device (e.g., a switch or router) 110(a) coupled to a plurality of network devices 110(b) and 110(c) via respective data links 120. Network devices 110(b) and 110(c) may exchange data with the switch/router 110(a) (and thus with each other) through respective data links 120. Network devices 110(b) and 110(c) may be any suitable network-enabled devices including, for example, computers, switches, routers, hubs, gateways, access points, or the like. Also, according to the present embodiments, network devices 110(b) and 110(c) may include any electronic device capable of connecting to either a wired or a wireless network including, for example, a mobile phone, a personal digital assistant (PDA), a set-top box, or a game console. Of course, router/switch 110(a), network devices 110(b) and 110(c), and data links 120 are just exemplary components of a network, as the network may further include any number of suitable devices to form a larger network including, for example, a local area network (LAN), a wide area network (WAN), a wireless LAN (WLAN), and/or may be connected to the Internet. Data links 120 may be any suitable physical media channel including, for example, coaxial cables, fiber-optics, and/or unshielded/shielded twisted pairs.

Network devices 110(a)-110(c) may communicate with each other using Ethernet technologies, as described in the IEEE 802.3 family of standards. More specifically, for exemplary embodiments described herein, network devices 110(a)-110(c) are each equipped with Ethernet-compliant transceivers (not shown in FIG. 1 for simplicity) that are capable of transmitting and receiving data packets at speeds of, for example, 100 Mbit/s and/or 10 Mbit/s.

Figure 2:
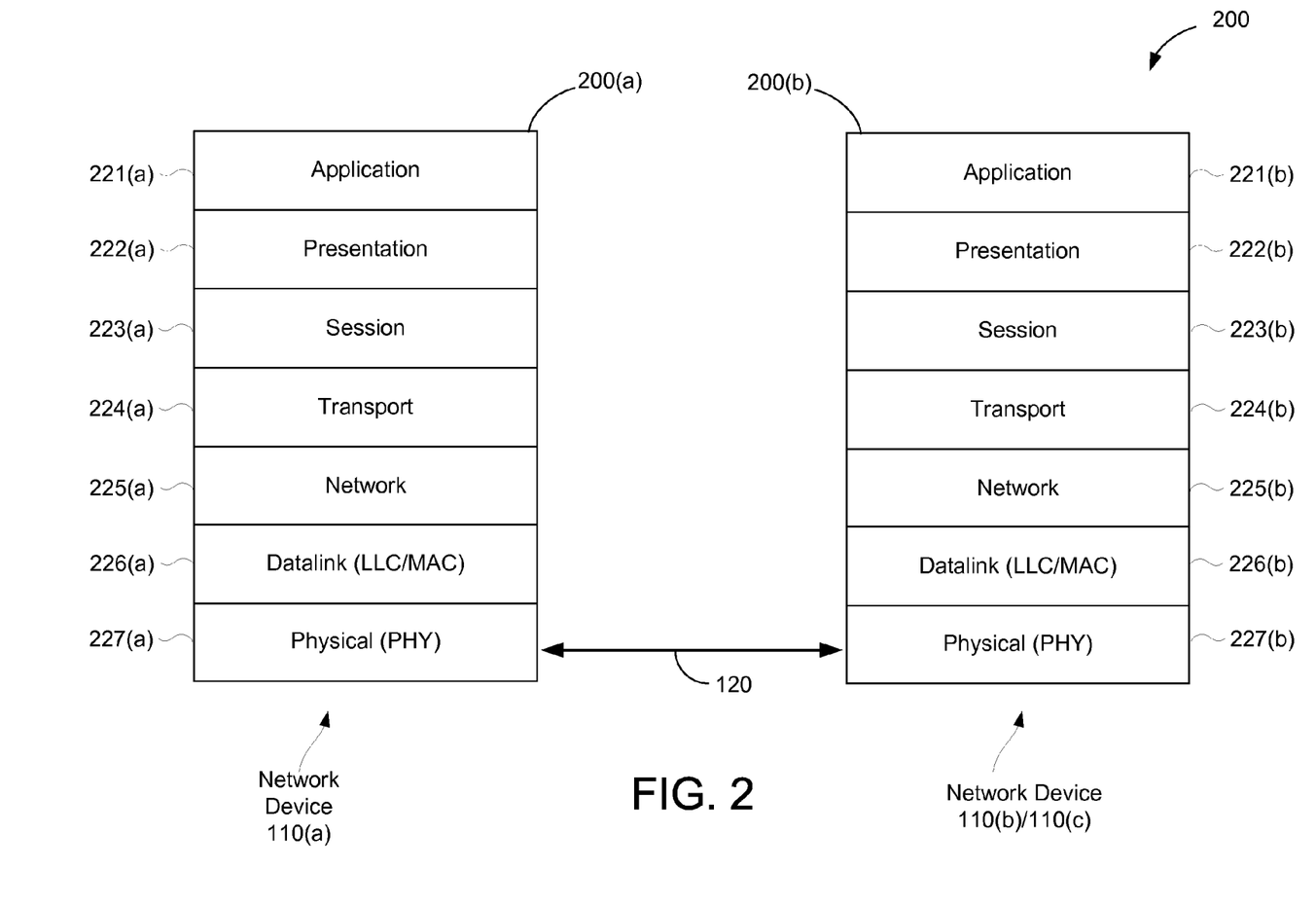
FIG. 2 is a block diagram of the open system interconnection (OSI) model representative of the network devices of FIG. 1.

FIG. 2 is a block diagram of the open system interconnection (OSI) models 200(a)-200(b) representative of the network devices 110(a) and 110(b) or 110(c), respectively, of FIG. 1. As in FIG. 1, network devices 110(a) and 110(b) or 110(c) are coupled to each other by the established data link (or physical channel) 120. As depicted in FIG. 2, the OSI model 200 is divided into seven logical layers: (1) an application layer 221; (2) a presentation layer 222; (3) a session layer 223; (4) a transport layer 224; (5) a network layer 225; (6) a datalink layer 226; and (7) a physical layer 227. Although the OSI model 200 may be used to represent network devices 110(a) and 110(b)/110(c) for purposes of discussion herein, it is noted that other suitable models maybe used to represent Ethernet devices configured in accordance with the present embodiments.

The higher in hierarchy an OSI layer is, the closer it is to an end user; the lower in hierarchy an OSI layer is, the closer it is to a physical channel. For example, on the top of the OSI model hierarchy is application layer 221, which interacts directly with the end user's software application (not shown in FIG. 2 for simplicity). On the contrary, on the bottom of the OSI model hierarchy is physical layer 227, which defines the relationship between a network device and a physical communication medium, such as twisted-pairs for Ethernet data transmissions.

More specifically, physical layer 227 provides electrical and physical specifications, including details like pin layouts and signal voltages, for interactions between network device 110 and physical channel 120. Datalink layer 226 provides the functional and/or procedural details, such as addressing and channel access control mechanisms, for data transmissions between network devices 110(a) and 110(b)/110(c). Datalink layer 226 has two sub-layers, which are the logical link control (LLC) layer on the top (in terms of hierarchy), and the media access control (MAC) layer on the bottom. For simplicity, datalink layer 226 is sometimes referred to herein as the MAC layer in the following discussion. Although not shown for simplicity in FIG. 2, an interface exists between the MAC layer 226 and the physical layer 227 to facilitate the exchange of information between the two layers. This interface is referred to as a media independent interface (MII), because the MAC layer is agnostic as to the physical medium used for transmission. (As used herein, the terms "media access interface" and "MII" refer to the entire genus of such interfaces and not to the specific interface of the same name, unless otherwise noted.) The MII allows network devices 110(a) and/or 110(b)/110(c) to interface with different types of physical channels 120 without necessarily replacing their MAC devices 226.

Figure 3:
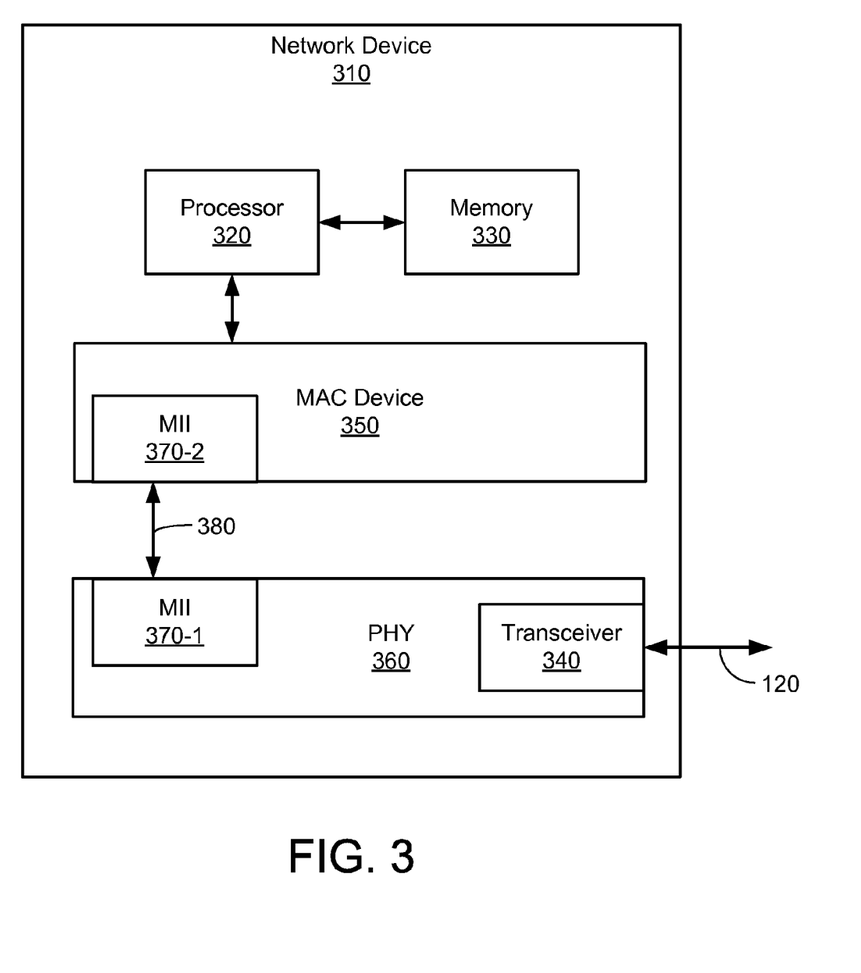
FIG. 3 is a block diagram of the network device of FIG. 1 in accordance with some embodiments.

FIG. 3 is a functional block diagram of a network device 310 that is one embodiment of the network devices 110(a) and/or 110(b)/110(c) of FIGS. 1 and 2. Network device 310 includes a processor 320, a memory 330, and an Ethernet transceiver circuit 340, which is coupled to one or more physical channels 120 of FIG. 2. In some embodiments, the transceiver circuit 340 includes transceiver circuitry for a plurality of channels (e.g., eight channels), and thus includes a plurality of ports (e.g., eight ports). Although Ethernet transceiver 340 is illustrated in FIG. 3 as being included in PHY 360, for other embodiments, transceiver 340 may be a stand-alone device or integrated circuit. Memory 330 may be any suitable memory element or device including, for example, EEPROM or Flash memory. Processor 320 may be any suitable processor capable of executing scripts or instructions of one or more software programs stored, for example, in memory 330. Although not shown in FIG. 3 for simplicity, network device 310 may also include a well-known cache memory that stores frequently used instructions and/or data.

Network device 310 includes a physical layer device (PHY) 360 and a MAC layer device (or MAC device) 350. PHY 360 and MAC device 350 each include a media independent interface 370-1 and 370-2, respectively, for transmitting signals between the two devices via a set of signal paths 380. In some embodiments, the signal paths 380 include a first differential pair (e.g., a low-voltage differential signaling pair) of signal lines for transmitting signals from PHY 360 to MAC device 350 and a second differential pair (e.g., a low-voltage differential signaling pair) of signal lines for transmitting signals from MAC device 350 to PHY 360. Each differential pair provides a one-bit data path between PHY 360 and MAC device 350. The signal paths thus include a first serial path from PHY 360 to MAC device 350 and a second serial path from MAC device 350 to PHY 360. In some embodiments, the signal paths 380 do not include any signal lines for transmitting clock signals between PHY 360 and MAC device 350. For example, the interfaces 370-1 and 370-2 may not be source-synchronous.

MAC device 350 may be any device or integrated circuit that implements the functions of MAC layer (e.g., layer 226 of FIG. 2), and may be a stand-alone device or may be integrated into network device 310. Similarly, PHY 360 may be any device or integrated circuit that implements the functions of the physical layer (e.g., layer 227 of FIG. 2), and may be a stand-alone device or may be integrated into network device 310. In some embodiments, PHY 360 and MAC device 350 are each implemented in integrated circuits mounted on a circuit board, and the signals paths 380 are implemented as traces on the circuit board.

During normal data transmission operations, when an end-user software application on network device 310 transmits data through the network (e.g., to the Internet), processor 320 processes the data in accordance with the top layers of the OSI model and then transmits the data through MAC device 350 to PHY 360. Then, PHY 360 transmits the data via transceiver 340 onto a physical channel 120.

Figure 4:
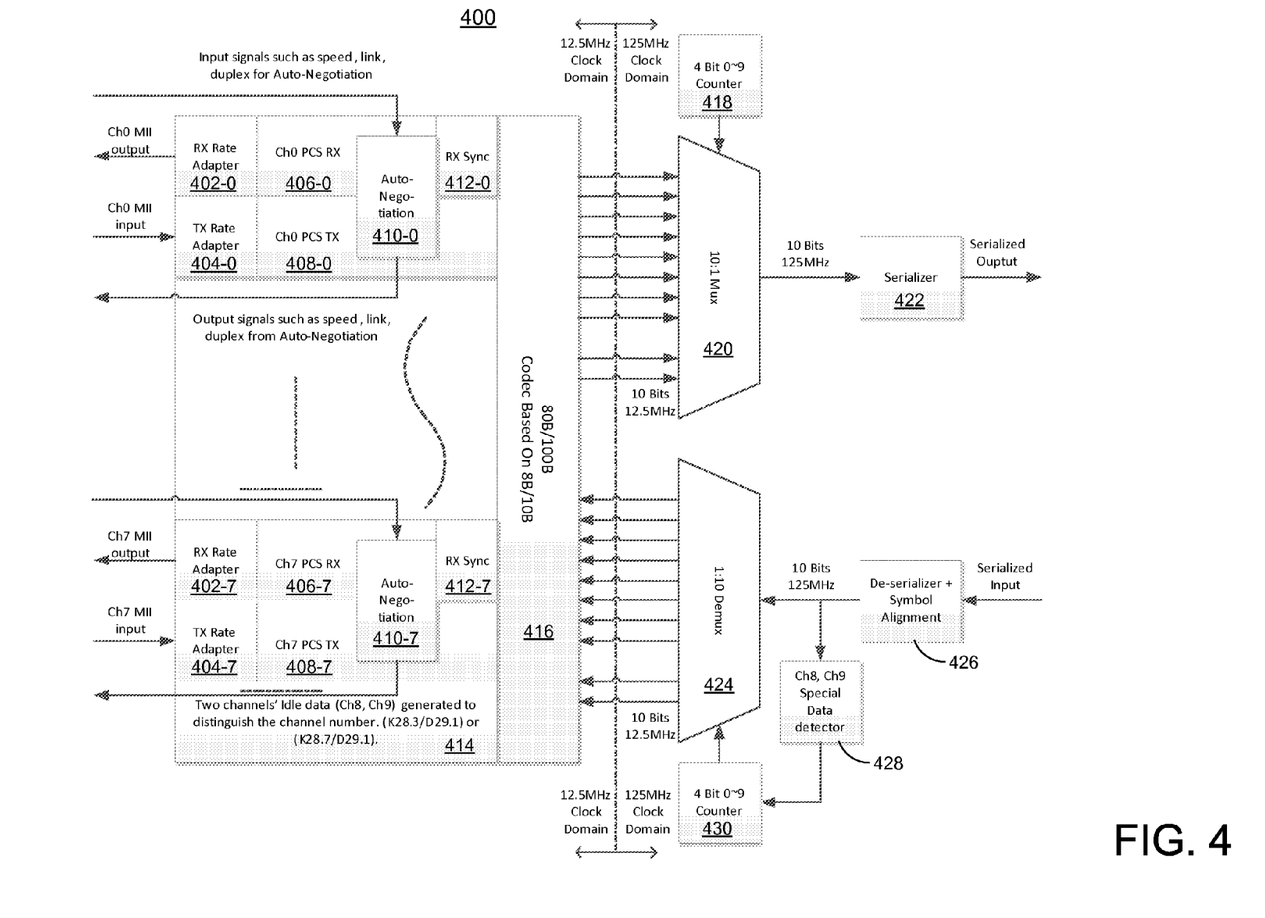
FIG. 4 is a block diagram of a media independent interface that provides a single serial dual-data-rate data path between eight PHY channels and eight MAC sub-layers in accordance with some embodiments.

FIG. 4 illustrates a media independent interface 400 that is an example of media independent interface 370-1 or 370-2 (FIG. 3). The interface 400 includes eight data channels (Ch0 through Ch7), each of which corresponds to a respective port in the transceiver circuitry 340 of PHY 360 and to a respective port of MAC device 350 (FIG. 3). The interface 400 thus links an eight port PHY with an eight port MAC. (More generally, the interface 400 includes a plurality of channels, the number of which may be more than eight or less than eight in other examples.) In some embodiments, each of the eight channels can operate in both half- and full-duplex at both 10/100 Mbps speeds (before 8B/10B encoding). Each of the eight channels thus can be used for either 10 Mbps or 100 Mbps signals (again, before 8B/10B encoding), and PHY 360 thus may be a 10/100 Mbps Ethernet PHY.

In addition, the interface 400 includes two additional channels 414 (Ch8 and Ch9). Special idle indicator symbols (e.g., K28.3 or K28.7 for Ch8 and D29.1 for Ch9) are transmitted from these channels 414 to provide an indication of channel numbers in the serialized output. (More generally, the interface includes one or more additional channels 414 to transmit idle symbols.) For example, the serialized output includes data for channels Ch0-Ch7 in turn (e.g., in round-robin) followed by the idle symbols of Ch8 and Ch9. The receiving interface can identify these idle symbols and use them as markers for channel alignment, to determine which data in the serialized input corresponds to which channels. (Alternatively, predefined symbols on other channels are used for channel alignment, such as K28.1 or K28.5 on Ch0 or Ch4.) In some embodiments, these two channels 414 also operate at 100 Mbps (before 8B/10B encoding). In some embodiments, the idle symbols are selected from known symbols that have not been reserved or used by equipment manufacturers for other purposes. The symbol used for a channel (e.g., whether Ch8 transmits K28.3 or K28.7) may be specified by a register bit.

Each of the eight channels Ch0-Ch7 includes a transmit path and a receive path. For each of Ch0-Ch7, the transmit path receives parallel (e.g., 8-bit wide) signals, including data signals, data valid signals, and error signals, at a transmission rate adapter 404. These signals are processed by a PCS transmit state machine 408 and encoded by an 80B/100B codec 416 (e.g., into 10-bit wide signals). Examples of operation of the 80B/100B codec 416 are described below with regard to FIGS. 6A and 6B. The encoded signals for each channel, and also for Ch8-Ch9, are multiplexed together by a 10:1 multiplexer 420 and serialized by a serializer 422, which drives a serialized output onto a first serial data path (e.g., a first differential pair of the signal paths 380, FIG. 3). Thus, in the example of FIG. 4, eight channels of data and two channels of idle symbols are multiplexed and serialized. In some embodiments, the data and idle symbols for respective channels are output by the 10:1 mux 420 (and thus also by the serializer 422) in round robin order, as determined by a 4-bit 0-9 counter 418 whose output is provided to the mux 420 as a control signal: data is output for Ch0, then Ch1, and so on until Ch9, after which data is output for Ch0 again, and the process repeats. In the example of FIG. 4, the 10:1 mux 420 outputs the 10 bits at 125 MHz and the serializer 422 provides the serialized output at 1.25 Gbps. In some embodiments, the serializer 422 drives the serialized output onto a first differential pair of the signal paths 380 (FIG. 3)

The receive path receives a serialized input, which is de-serialized (e.g., into 10-bit wide signals) by a de-serializer 426 that also performs symbol alignment. In some embodiments, the de-serializer 426 includes CDR circuitry to perform clock and data recovery. In the example of FIG. 4, the de-serializer 426 receives serialized input at 1.25 GHz (e.g., from a second differential pair of the signal paths 380, FIG. 3) and outputs parallel 10-bit words at 125 MHz. The parallel 10-bit words are provided to a 1:10 demultiplexer (demux) 424 that demuxes the 10-bit words to respective channels (e.g., to channels Ch0-Ch9 in round-robin fashion). The 10-bit words are also provided to a data detector 428 that detects the special symbols on Ch8 and Ch9 used for channel identification and alignment. The data detector 428 provides a signal to a 4-bit 0-9 counter 430 in response to detection of the symbols on Ch8 and Ch9. The counter 430 accordingly provides its output as a control signal to the 1:10 demux 424. The control signal controls the channels to which the demux 424 provides respective 10-bit words and thus assures that data is provided to the proper channels.

The transmit path of each of Ch0-Ch7 includes a transmission rate adapter 404 (e.g., adapter 404-0 for Ch0 and 404-7 for Ch7). If MII input frames are provided to a channel at a rate less than the maximum possible rate for the channel, the transmission rate adapter 404 elongates the frames by replicating the frames. In the example of FIG. 4, the maximum rate for each channel is 100 Mbps. If 10 Mbps frames are provided to the channel (e.g., the channel corresponds to a 10 Mbps port), the rate adapter 404 replicates each frame 10 times, resulting in a rate of 100 Mbps for the channel. Similarly, the receive path of each of Ch0-Ch7 includes a receiver rate adapter 402 (e.g., adapter 402-0 for Ch0 and 402-7 for Ch7) that reverses the process, and thus allows a 100 Mbps channel to provide 10 Mbps output frames as its MII output. In some embodiments, the rate adapters 402 and 404 operate in accordance with received speed information.

The MII data in 10 Mbps mode thus is replicated ten times after passing the rate adapter. The Start of Packet (SPD) delimiter (/S/) only appears once per frame. An internal READ_EN signal is used to enable the sampling of data starting at a specified data segment (e.g., the first data segment, or another data segment) once every ten data segments in 10 Mbps mode.

Figure 5:
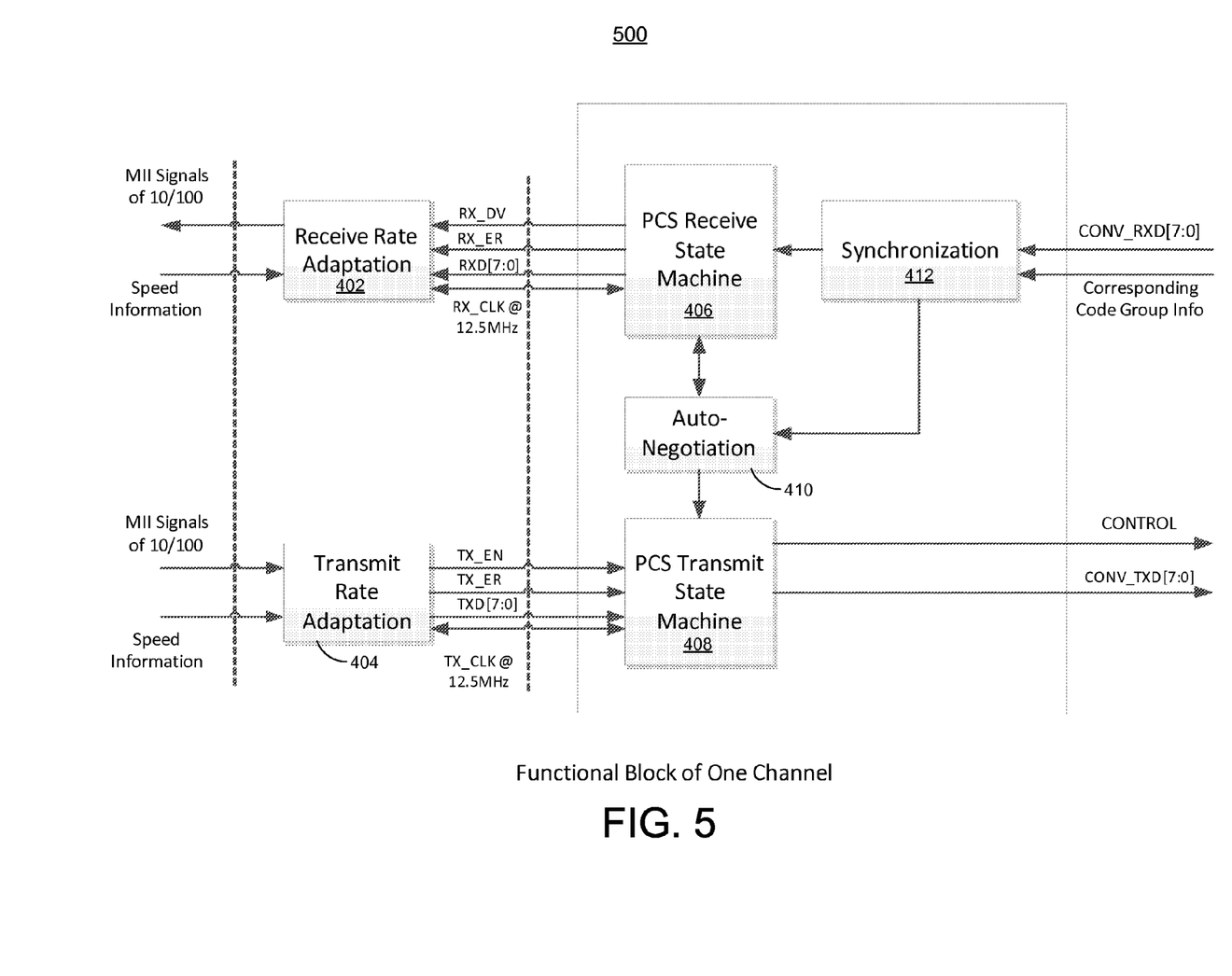
FIG. 5 is a block diagram of a functional block for a channel in the media independent interface of FIG. 4 in accordance with some embodiments.

In the example of FIG. 4, MII signals are received at the transmitter side at 10/100 Mbps and are clocked at 2.5/25 MHz, respectively. These signals pass through the transmission rate adapter 404, which outputs 8-bit data in a 12.5 MHz clock domain. The data then is sent to the PCS Transmit State Machine 408, as shown in FIG. 5, to generate replaced 8-bit data with a corresponding control bit for encoding later. In some embodiments, to ensure proper functioning of the PCS layer, MII frames begin with at least two preamble symbols followed by a SFD symbol. In the receive path, 8-bit data and corresponding code group information is received from the 80B/100B codec 416 in the 12.5 MHz clock domain. This data and information is processed by the synchronization block 412 and PCS Receive State Machine 406. The synchronization block 412 checks the code group information to determine the synchronization status between link partners and to re-align if it detects that the synchronization is lost. The PCS Receive State Machine 406 recovers the MII signals and provides the recovered MII signals to the receive rate adapter 402, which outputs the signals at 10 or 100 Mbps (e.g., according to the corresponding port speed information).

According to the assertion and deassertion of RX_DV, the transmitter encodes the Start of Packet delimiter (SPD /S/) and the End of Packet (EPD /T/) to signal the beginning and end of each packet. The receiver side recovers the RX_DV signal by detecting these two delimiters. The transmitter encodes an Error_Propagation (/V/) ordered set to indicate a data transmission error. The receiver side asserts RX_ER signal whenever it detects this ordered set. CRS and COL are not directly encoded but generated on the receiver side using RX_DV and TX_EN.

The transmit PCS circuitry of each of Ch0-Ch7 includes PCS circuitry (e.g., the PCS transmit state machine 408) that converts MII packets (including, for example, traditional MII data signals, data valid signals, and error signals) to data compatible with 8B/10B encoding (e.g., 8-bit packet data and a corresponding control bit k). This data is provided to the 80B/100B codec 416 for encoding. Likewise, the receive PCS circuitry of Ch0-Ch7 includes PCS circuitry (e.g., the PCS receive state machine 406) that converts decoded data from the 80B/100B codec 416, as synchronized by the receive synchronization block 412, to MII packets that are then provided to the receive rate adapter 402. In some embodiments, the transmit and receive data paths leverage the 1000BASE-X PCS defined in the IEEE802.3z specification (clause 36).

In some embodiments, to align with QSGMII, the use of K28.5 on channel 0 and channel 4 is replaced with K28.1. This may be done on eight bits rather than ten bits. Whether K28.1 or K28.5 is used may be controlled by a register. The receive path may be configured to treat K28.1 and K28.5 identically. There are several options to not use the K28.1 swapper, which the interface 400 does not rely on for channel indication in accordance with some embodiments. For example, two dedicated control bits can control whether swapping is performed.

With regard to encoding, IEEE 802.3z provides rules for handling running disparity by sending out one of the two IDLE order sets, referred to as /I1/ and /I2/. In the interface 400, however, since the 80B/100B encoder 416 is detached from the function of the PCS transmit state machine 408, only /I1/ ordered sets are generated in some embodiments. Also, due to the nature of 80B/100B encoding, bit errors on the link may cause a running disparity error to propagate across ports. Disparity checks that rely on the running disparity value from the previous symbol are therefore disabled in accordance with some embodiments.

After frame elongation, the data rate of each of Ch0-Ch7 is 100 Mbps. After encoding this data rate increases to 125 Mbps, resulting in a total data rate of 1 Gbps. The two channels 414 (Ch8 and Ch9) that transmit special idle symbols as an indication of channel numbers use another 0.25 Gbps (i.e., a 25% overhead), resulting in a total data rate for all channels combined of 1.25 Gbps. The serialized output thus has a data rate of 1.25 Gbps in some embodiments. More generally, the serialized output has a data rate equal to the data rate of all channels combined after encoding, including the data rates of channels transmitting idle symbols.

The interface 400 may be configured in PHY mode or MAC mode, depending on whether it is situated in PHY 360 or MAC device 350 (FIG. 3). Auto-negotiation circuitry 410 (e.g., including circuitry 410-0 for Ch0 and 410-7 for Ch7) is used to specify the mode. Control information (e.g., as specified in Table 1 below) is transferred from PHY 360 to MAC device 350 (e.g., in response to a change of the control information). In some embodiments, this is achieved by leveraging the auto-negotiation mechanism defined in 802.3z clause 37. In some embodiments, the link-timer inside the auto-negotiation mechanism 410 has been changed from 10 ms to 1.6 ms to ensure a prompt update of the link status.

The interface 400 in MAC device 350 thus follows auto-negotiation results between the local PHY 360 (e.g., the local copper PHY) and a remote PHY (e.g., a remote copper PHY). The local PHY 360 updates the control information when the link status has changed. If the local PHY 360 detects a link change, it starts its corresponding auto-negotiation mechanism 410, configures the corresponding channel from a "data" state to a "configuration" state, and sends out the updated control information by transmitting the values of configuration register tx_config_reg[15:0] to MAC device 350. The receive path of the corresponding channel on the MAC 350 side receives and decodes the control information, and starts the MAC's auto-negotiation mechanism 410. The MAC 350 side acknowledges the update of link status by asserting bit 14 of tx_config_reg and transmitting tx_config_reg via the channel's transmit path to the local PHY 360. Upon receiving the acknowledgement from MAC 350, PHY 360 completes the auto-negotiation process and returns to the "data" state (e.g., to normal data transmission and reception). In some embodiments, the expected latency of the update of link status corresponds to two link timer times and the acknowledgement process time (e.g., for a total of 3.4 ms).

In some embodiments, instead of performing ability advertisement, the auto-negotiation circuit 410 in PHY 360 sends to the auto-negotiation circuit 410 in MAC device 350 the control information (e.g., obtained from copper PHY/MAC configuration) specified in its tx_config_reg[15:0], as shown in Table 1, whenever the control information changes. Upon receiving the updated information, the auto-negotiation circuit 410 in MAC device 350 performs an acknowledgment by asserting bit 14 of its own tx_config_reg as specified in Table 1 and transmitting its tx_config_reg to PHY 360 in response. Transmitted information includes the link status, duplex mode, and speed.

TABLE 1

Definition of control information in tx_config_reg[15:0]

| Bit Number | Tx_config_reg[15:0] sent from PHY to the MAC | the Tx_config_reg[15:0] sent from the MAC to the PHY |
| --- | --- | --- |
| 15 | Link: 1 = link up, 0 = link down | 0: reserved for future use |
| 14 | Reserved for Auto-Negotiation acknowledge as specified in 802.3z | 1 |
| 13 | 0: reserved for future use | 0: reserved for future use |
| 12 | Duplex mode: 1= full duplex, 0 = half duplex | 0: reserved for future use |
| 11:10 | Speed: bit 11, 10: 1x: Reserved 01 = 100 Mbps: 100BASE-TX, 100BASE-FX 00 = 10 Mbps: 10BASET, 10BASE2, 10BASE5 | 0: reserved for future use |
| 9:1 | 0: reserved for future use | 0: reserved for future use |
| 0 | 1 | 1 |

In some embodiments, the interface 400 supports IEEE 802.3az low-power idle flow between PHY 360 and MAC device 350, and thus Energy Efficient Ethernet (EEE) low power mode for PHY 360 and MAC device 350. For example, the transmit PCS state machine 408 applies a special code group for LPI idle to support the transparent flow of LPI signals between MAC device 350 and PHY 360.

By multiplexing all eight data channels into a single SerDes (e.g., the combination of serializer 422 and de-serializer 426) operating at 1.25 Gbps, the interface 400 (including the functional blocks of FIG. 5) uses less power and produces less EMI than other octal-channel MII solutions. For example, octal QSGMII would require two SerDes, including one SerDes for each group of four channels, with each SerDes operating at 5 Gbps. Octal SGMII would require eight SerDes, one for each channel. The interface 400 also uses fewer pins than other solutions: it uses only four pins (2 for each serial data path), as opposed to eight pins for octal QSGMII and 20 pins for octal S3MII. (The term pin as used herein includes solder balls, lands, and any other structures used to electrically connect a semiconductor package to a circuit board.) Unlike S3MII, the interface 400 is not source-synchronous; it uses CDR technology for clock and data recovery. The interface 400 also allows for reasonable trace lengths (e.g., up to 3 ns/45 cm traces for the data path in some embodiments) and simple/low-cost board design (e.g., two-layer boards in some embodiments). Furthermore, the interface 400 may be easily extended for additional channels.

FIG. 5 is a block diagram of a functional block for one channel in the media independent interface 400 in accordance with some embodiments. The circuitry shown in FIG. 5 corresponds to the circuitry shown in the 12.5 MHz clock domain and prior to the 80B/100B codec in FIG. 4.

Figure 6A:
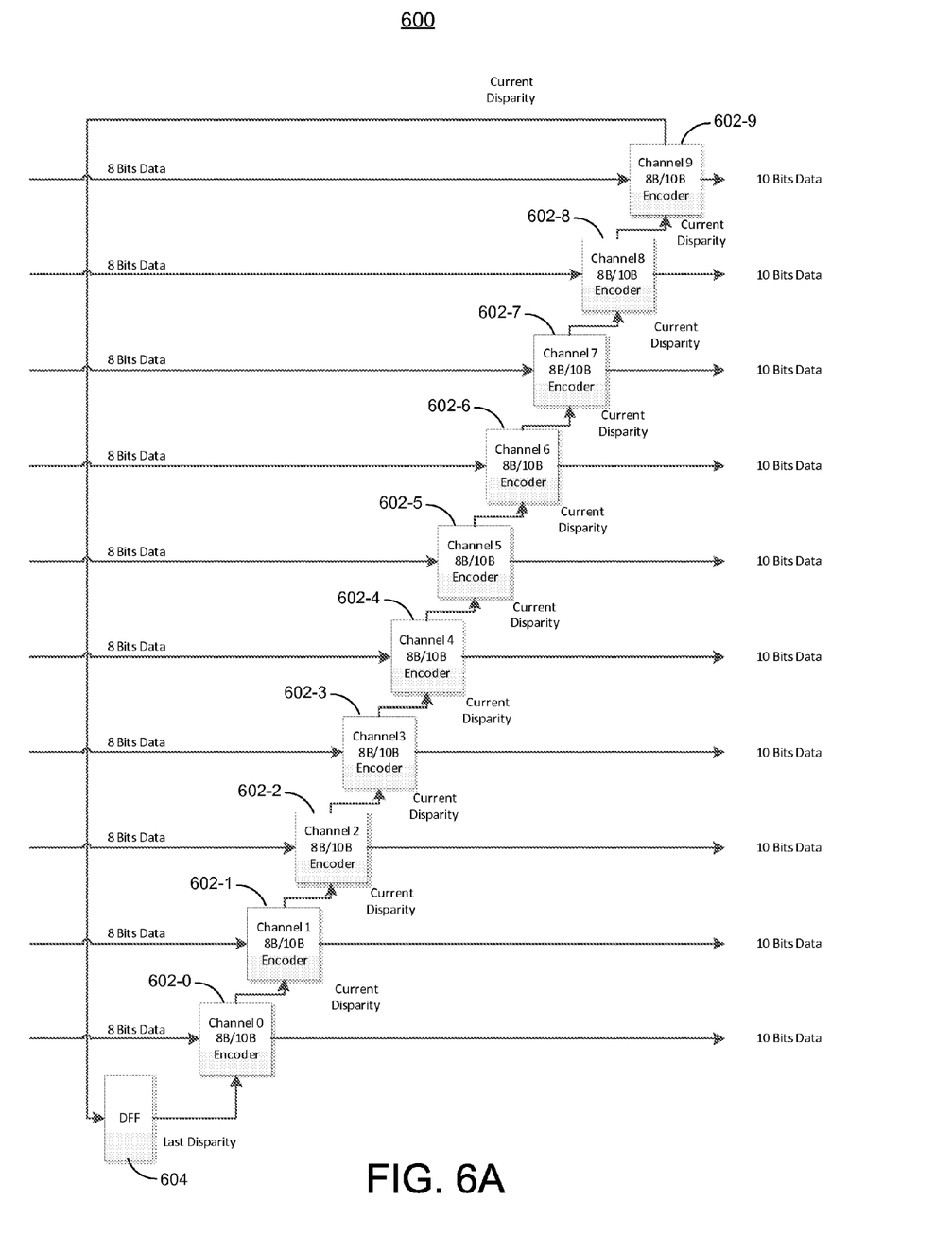
FIG. 6A is a block diagram illustrating a running disparity scheme for encoding data in the media independent interface of FIG. 4 in accordance with some embodiments.

FIG. 6A is a block diagram illustrating a running disparity scheme 600 for encoding data in the media independent interface 400 in accordance with some embodiments. The running disparity scheme 600 is used in some embodiments of the 80B/100B codec 416 (FIG. 4). For each of the ten channels Ch0-Ch9, 8 bits of data (e.g., an 8-bit wide data word) are provided to an 8B/10B encoder 602: 8 bits of data for Ch0 are provided to a first encoder 602-0, 8 bits of data for Ch1 are provided to a second encoder 602-1, and so on. While FIG. 6A shows a separate 8B/10B encoder 602 for each channel, in some embodiments the same 8B/10B encoder 602 is used for all channels, with appropriate storage of state information for each channel. The disparity for a respective channel is provided to the next channel for use in encoding the next channel, and thus represents a running disparity. For example, the disparity for Ch0 is provided to the Ch1 encoder 602-1, the disparity for Ch1 is provided to the Ch2 encoder 602-2, and so on, with the disparity for Ch9 being provided to the Ch0 encoder 602-0 (e.g., via a flip-flop 604). The disparity of the last channel (e.g., Ch9) thus is provided to the encoder for the first channel (e.g., Ch0). Disparity indicates whether the data has more 1's than 0's (e.g., as indicated by a disparity value of '1') or more 0's than 1's (e.g., as indicated by a disparity value of '0').

Figure 6B:
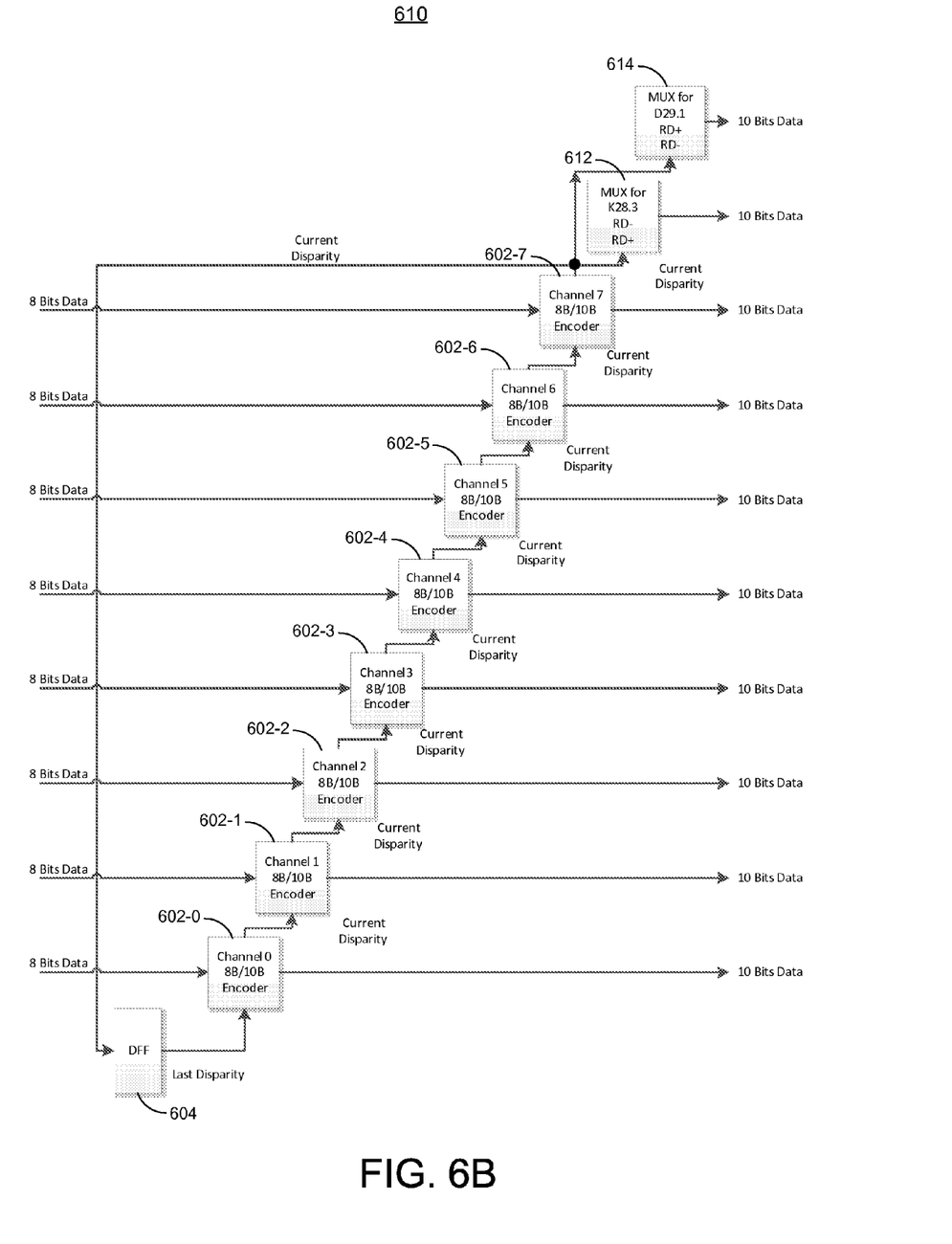
FIG. 6B is a block diagram illustrating another running disparity scheme for encoding data in the media independent interface of FIG. 4 in accordance with some embodiments.

FIG. 6B is a block diagram illustrating another running disparity scheme 610 for encoding data in the media independent interface 400 in accordance with some embodiments. The running disparity scheme 610 is used in some embodiments of the codec 416 (FIG. 4). For each of the eight data channels Ch0-Ch7, 8 bits of data (e.g., an 8-bit wide data word) are provided to an 8B/10B encoder 602: 8 bits of data for Ch0 are provided to a first encoder 602 0, 8 bits of data for Ch1 are provided to a second encoder 602-1, and so on. The encoders 602-0 through 602-7 compose a 64B/80B encoder for the eight data channels Ch0-Ch7. While FIG. 6A shows a separate 8B/10B encoder 602 for each data channel, in some embodiments the same 8B/10B encoder 602 is used for all channels, with appropriate storage of state information for each channel. The disparity for a respective data channel is provided to the next data channel for use in encoding the next data channel. (The term data channel refers to Chs0-7 in this example and not to Chs8-9, which do not transmit MII data but instead transmit idle symbols for channel identification and alignment.) For example, the disparity for Ch0 is provided to the Ch1 encoder 602-1, the disparity for Ch1 is provided to the Ch2 encoder 602-2, and so on, with the disparity for Ch7 being provided to the Ch0 encoder 602-0 (e.g., via a flip-flop 604). The disparity of the last data channel (e.g., Ch7) thus is provided to the encoder for the first data channel (e.g., Ch0). The disparity of the last data channel (e.g., Ch7) also is provided to multiplexers 612 and 614 for Ch8 and Ch9. The data for Ch8 and Ch9 thus are generated by choosing corresponding symbols according to the running disparity from Ch7: the multiplexers 612 and 614 choose output symbol for Ch8 and Ch9 to match the running disparity from Ch7. This reduces the propagation delay along the running disparity chain as compared to FIG. 6A and simplifies design, while assuring that the disparity is corrected when data for all of channels Ch0-Ch9 are muxed together. In some embodiments, the available idle symbols associated with one or both of Ch8 and Ch9 can be specified by a register setting. For example, Ch8 is shown in FIG. 6B as transmitting K28.3, but can be configured (e.g., by setting a register bit) to transmit another symbol (e.g., K28.7). Idle symbols are chosen to allow proper alignment of symbol boundaries.

Figure 7A:
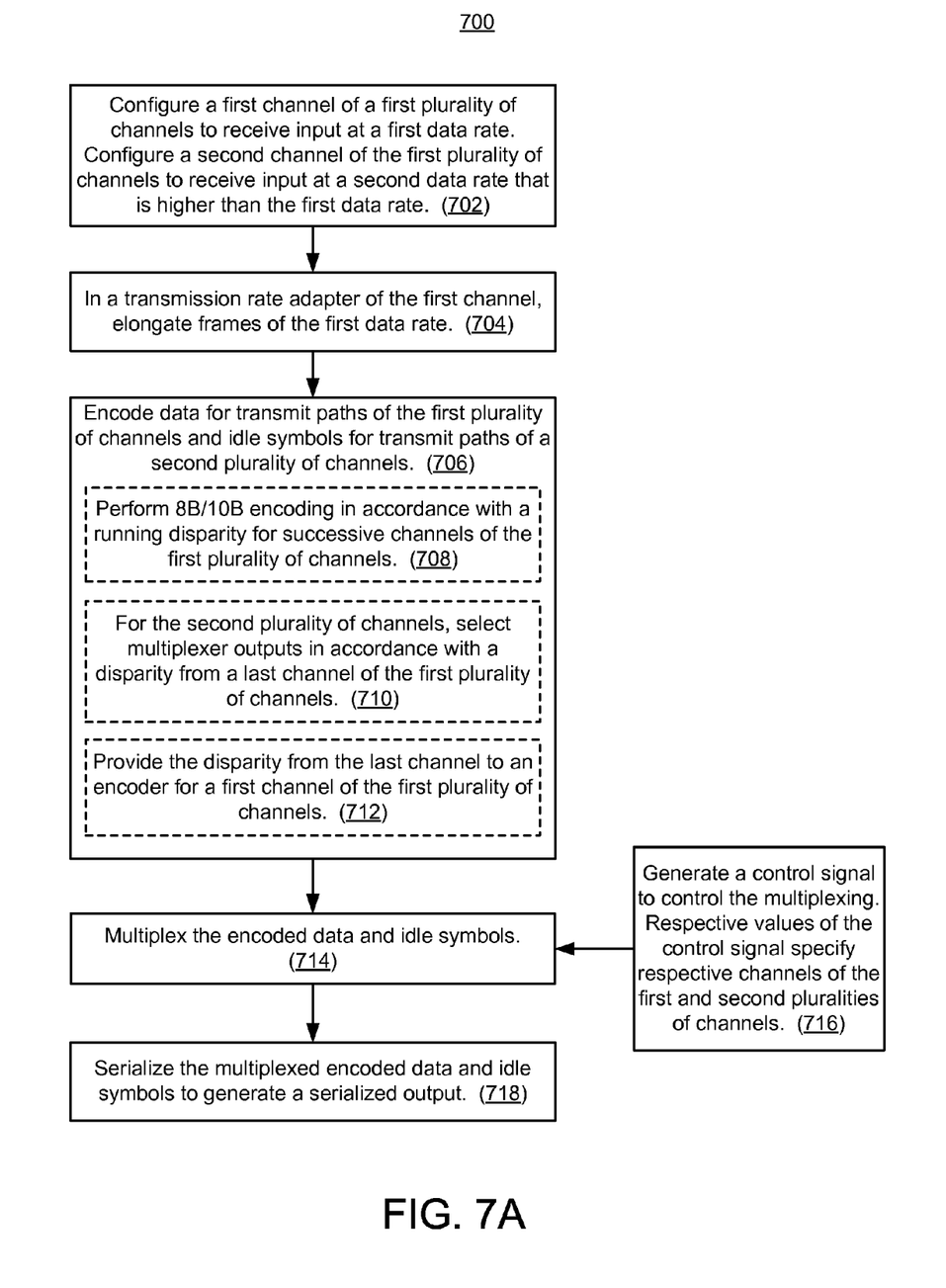
FIGS. 7A and 7B are flowcharts illustrating methods of operating a media independent interface in accordance with some embodiments.

FIG. 7A is a flowchart illustrating a method 700 of operating a media independent interface, such as the interface 400 (FIG. 4), in accordance with some embodiments. In the method 700, a first channel of a first plurality of channels (e.g., Ch0-7) is configured (702) to receive input at a first data rate and a second channel of the first plurality of channels is configured to receive input at a second data rate that is higher than the first data rate. (In some embodiments, each channel of the plurality of channels, or a subset thereof, is independently configured to receive data at either the first or data rate.) In a transmission rate adapter (e.g., rate adapter 404, FIG. 5) of the first channel, frames of the first data rate are elongated (704). (In some embodiments, the transmission rate adapter 404 of each channel that is configured to receive data at the first data rate elongates frames of the first data rate.) For example, the first data rate is 10 Mbps, the second data rate is 100 Mbps, and the transmission rate adapter 404 elongates 10 Mbps frames.

Data for transmit paths of the first plurality of channels (e.g., Ch0-7) and idle symbols for transmit paths of a second plurality of channels (e.g., Ch8-9) are encoded (706). In some embodiments, 8B/10B encoding is performed (708) in accordance with a running disparity for successive channels of the first plurality of channels. For example, codec 416 performs 8B/10B encoding for respective channels in accordance with the running disparity scheme 600 (FIG. 6A) or 610 (FIG. 6B). In some embodiments, for the second plurality of channels, multiplexer outputs (e.g., for multiplexers 612 and 614, FIG. 6B) are selected (710) in accordance with a disparity from a last channel (e.g., Ch7) of the first plurality of channels. In some embodiments, the disparity from the last channel (e.g., Ch7) is provided (712) to an encoder for a first channel (e.g., to encoder 602-0 for Ch0) of the first plurality of channels.

The encoded data and idle symbols are multiplexed (714). A control signal is generated (716) to control the multiplexing. Respective values of the control signal specify respective channels of the first and second pluralities of channels. For example, counter 418 (FIG. 4) outputs a control signal to mux 420. The values of the control signal increment from zero to nine, with each value specifying a corresponding one of Ch0-9.

The multiplexed encoded data and idle symbols are serialized (718)(e.g., by serializer 422, FIG. 4, which together with de-serializer 426 composes a SerDes) to generate a serialized output.

Figure 7B:
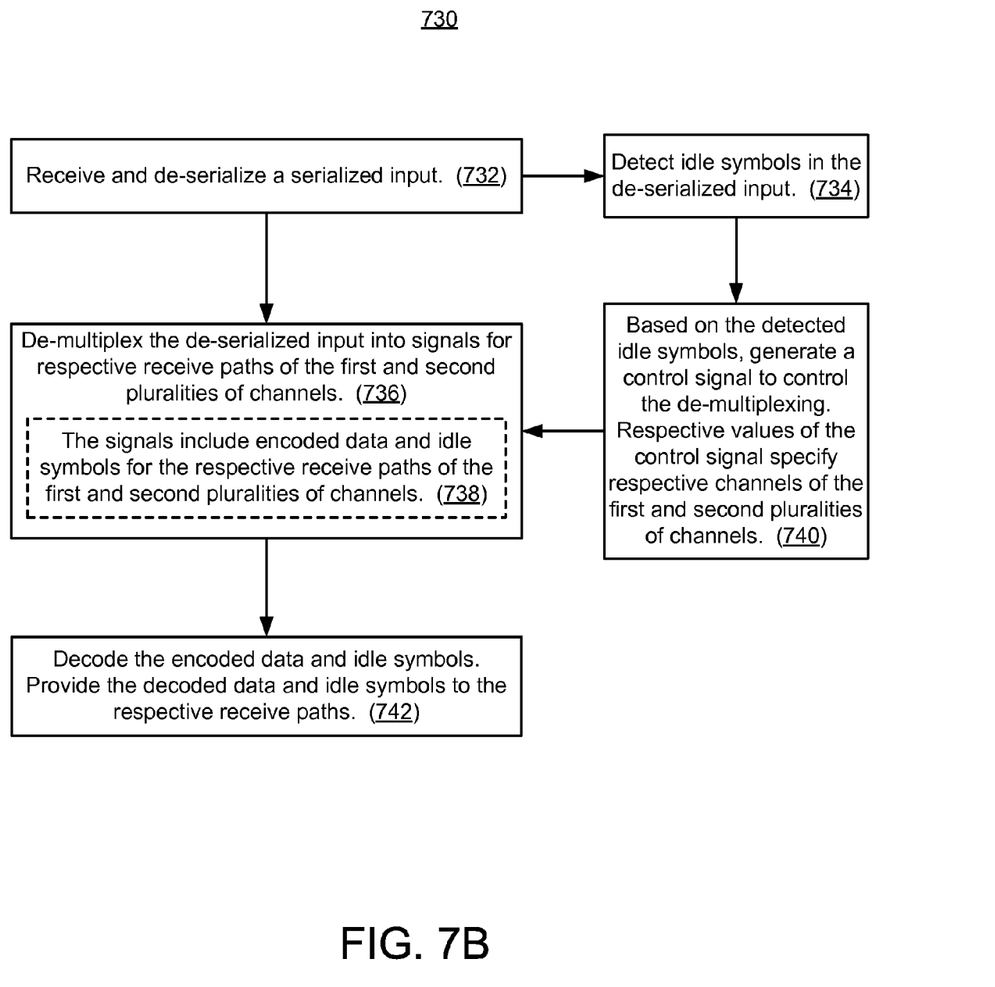

FIG. 7B is a flowchart illustrating a method 730 of operating a media independent interface, such as the interface 400 (FIG. 4), in accordance with some embodiments. The method 730 may be performed together with (e.g., simultaneously with) the method 700 (FIG. 7A). In the method 730, a serialized input is received and de-serialized (732) (e.g., by the de-serializer 426).

The de-serialized input is de-multiplexed (736) into signals for respective receive paths of the first and second pluralities of channels. For example, the de-mux 424 performs the de-multiplexing. In some embodiments, the signals include (738) encoded data for respective receive paths of the first plurality of channels (e.g., Ch0-7) and idle symbols for the respective receive paths of the second plurality of channels (e.g., Ch8-9).

Idle symbols are detected (734) in the de-serialized input (e.g., by data detector 428, FIG. 4). Based on the detected idle symbols, a control signal is generated (740) to control the de-multiplexing. Respective values of the control signal specify respective channels of the first and second pluralities of channels. For example, counter 430 (FIG. 4) outputs a control signal to demux 424 based on idle symbols detected by data detector 428. The values of the control signal increment from zero to nine, with each value specifying a corresponding one of Ch0-9.

The encoded data and symbols are decoded (742) and provided to the respective receive paths. For example, codec 416 (FIG. 4) performs the decoding and provides decoded data to respective receive synchronization blocks 412.

The methods 700 (FIG. 7A) and 730 (FIG. 7B) provide a low power, low EMI, and low pin count approach to multi-channel (e.g., octal channel) MII communications. While the methods 700 and 730 include a number of operations that appear to occur in a specific order, it should be apparent that the methods 700 and 730 can include more or fewer operations, which can be executed serially or in parallel. An order of two or more operations may be changed and/or two or more operations may be combined into a single operation. For example, all of the operations of the methods 700 and/or 730 may be performed in an ongoing manner during operation of the interface 400 (FIG. 4).

In the foregoing specification, the present embodiments have been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. A media independent interface in an integrated circuit device, comprising:
   a first plurality of channels, each comprising a transmit path to transmit data;
   a second plurality of channels, each comprising a transmit path to transmit a respective idle symbol;
   a codec, coupled to the transmit paths of the first and second pluralities of channels, to encode the data and idle symbols on the transmit paths, the codec comprising:
      encoding circuitry to encode data on the transmit paths of the first plurality of channels in accordance with a running disparity for successive channels of the first plurality of channels, and
      multiplexing circuitry to receive a disparity from a last channel of the first plurality of channels and to select idle symbols for the second plurality of channels in accordance with the disparity from the last channel;
   a multiplexer, coupled to the codec, to multiplex the encoded data and idle symbols; and
   a serializer, coupled to the multiplexer, to serialize the multiplexed data and idle symbols.

2. The media independent interface of claim 1, wherein:
   each channel of the first plurality of channels further comprises a receive path to receive data; and
   each channel of the second plurality of channels further comprises a receive path to receive the respective idle symbol.

3. The media independent interface of claim 2, further comprising:
   a de-serializer to de-serialize a serialized input; and
   a de-multiplexer, coupled to the de-serializer, to demultiplex the de-serialized input into encoded data and idle symbols for respective receive paths of the first and second pluralities of channels;
   wherein the codec is coupled between the de-multiplexer and the receive paths of the first and second pluralities of channels and is to decode the encoded data and symbols and provide the decoded data and idle symbols to respective receive paths.

4. The media independent interface of claim 3, further comprising:
   a data detector, coupled to the de-serializer, to detect idle symbols; and
   a counter, coupled between the data detector and the de-multiplexer, to provide a control signal to the de-multiplexer based on detected idle symbols, wherein respective values of the control signal specify respective channels of the first and second pluralities of channels.

5. The media independent interface of claim 1, further comprising a counter, coupled to the multiplexer, to provide a control signal to the multiplexer, wherein respective values of the control signal specify respective channels of the first and second pluralities of channels.

6. The media independent interface of claim 1, wherein:
   the encoding circuitry comprises respective 8B/10B encoders to encode data on respective transmit paths of the first plurality of channels; and
   the respective 8B/10B encoder for the last channel of the first plurality of channels comprises an output to provide the disparity from the last channel to the multiplexing circuitry and the respective 8B/10B encoder for a first channel of the first plurality of channels.

7. The media independent interface of claim 1, wherein:
   the first plurality of channels comprises eight channels;
   the second plurality of channels comprises two channels; and
   the codec comprises a 64B/80B codec for the eight channels of the first plurality of channels.

8. The media independent interface of claim 1, wherein the second plurality of channels comprises a first channel to transmit a K28.3 or K28.7 symbol and a second channel to transmit a D29.1 symbol.

9. The media independent interface of claim 1, wherein:
   a respective channel of the first plurality of channels is configurable to receive input at a plurality of data rates, including a first data rate and a second data rate higher than the first data rate; and
   the transmit path of the respective channel comprises a rate adapter to elongate frames of the first data rate.

10. A method of operating a media independent interface in an integrated circuit, comprising:
    encoding data for transmit paths of a first plurality of channels by performing 8B/10B encoding in accordance with a running disparity for successive channels of the first plurality of channels;
    encoding idle symbols for transmit paths of a second plurality of channels by selecting multiplexer outputs in accordance with a disparity from a last channel of the first plurality of channels;
    multiplexing the encoded data and idle symbols; and
    serializing the multiplexed encoded data and idle symbols to generate a serialized output.

11. The method of claim 10, further comprising:
    receiving and de-serializing a serialized input; and
    de-multiplexing the de-serialized input into signals for respective receive paths of the first and second pluralities of channels.

12. The method of claim 11, wherein the signals comprise encoded data and idle symbols for the respective receive paths of the first and second pluralities of channels, the method further comprising decoding the encoded data and idle symbols and providing the decoded data and idle symbols to the respective receive paths.

13. The method of claim 11, further comprising:
   detecting idle symbols in the de-serialized input; and
   based on the detecting, generating a control signal to control the de-multiplexing, wherein respective values of the control signal specify respective channels of the first and second pluralities of channels.

14. The method of claim 10, further comprising generating a control signal to control the multiplexing, wherein respective values of the control signal specify respective channels of the first and second pluralities of channels.

15. The method of claim 10, further comprising providing the disparity from the last channel to an encoder for a first channel of the first plurality of channels.

16. The method of claim 10, wherein:
   the first plurality of channels comprises eight channels;
   the second plurality of channels comprises two channels; and
   encoding the data and idle symbols comprises performing 80B/100B encoding.

17. The method of claim 10, wherein the second plurality of channels comprises a first channel transmitting a K28.3 or K28.7 symbol and a second channel transmitting a D29.1 symbol.

18. The method of claim 10, wherein the transmit paths of the first plurality of channels comprise respective transmission rate adapters, the method further comprising:
   configuring a first channel of the first plurality of channels to receive input at a first data rate;
   configuring a second channel of the first plurality of channels to receive input at a second data rate, the second data rate being higher than the first data rate; and
   in the transmission rate adapter of the first channel, elongating frames of the first data rate.

19. A media independent interface in an integrated circuit device, comprising:
   means for encoding data for transmit paths of a first plurality of channels in accordance with a running disparity for successive channels of the first plurality of channels;
   means for encoding idle symbols for transmit paths of a second plurality of channels by receiving a disparity from a last channel of the first plurality of channels and selecting idle symbols for the second plurality of channels in accordance with the disparity from the last channel;
   means for multiplexing the encoded data and idle symbols; and
   means for serializing the multiplexed encoded data and idle symbols to generate a serialized output.

20. The media independent interface of claim 19, further comprising:
   means for de-serializing a serialized input; and
   means for de-multiplexing the de-serialized input into signals for respective receive paths of the first and second pluralities of channels.

* * * * *